(12) United States Patent
Katpelly et al.

(10) Patent No.: US 9,172,812 B2
(45) Date of Patent: Oct. 27, 2015

(54) SYSTEM AND METHOD FOR ASSISTING A CALLEE AND A CALLER IN ESTABLISHING TELEPHONIC COMMUNICATIONS

(75) Inventors: Ravi Reddy Katpelly, Cary, NC (US); Kunal Kandekar, Jersey City, NJ (US)

(73) Assignee: Modena Enterprises, LLC, Wilmington, DE (US)

( * ) Notice: Subject to any disclaimer, the term of this patent is extended or adjusted under 35 U.S.C. 154(b) by 455 days.

(21) Appl. No.: 13/398,361

(22) Filed: Feb. 16, 2012

(65) Prior Publication Data

US 2012/0207294 A1 Aug. 16, 2012

Related U.S. Application Data

(60) Provisional application No. 61/443,400, filed on Feb. 16, 2011.

(51) Int. Cl.
*H04M 3/42* (2006.01)
*H04M 3/54* (2006.01)

(52) U.S. Cl.
CPC ............ *H04M 3/54* (2013.01); *H04M 3/42357* (2013.01); *H04M 2203/2094* (2013.01)

(58) Field of Classification Search
USPC .............. 379/207.08, 207, 9, 211.01, 212.01, 379/201.01; 455/417, 414.1
See application file for complete search history.

(56) References Cited

U.S. PATENT DOCUMENTS

| 7,069,018 | B1 * | 6/2006 | Granstam et al. .......... 455/456.1 |
| 2009/0280817 | A1 * | 11/2009 | Chavez et al. ................ 455/445 |
| 2010/0080376 | A1 * | 4/2010 | Hartley et al. ........... 379/211.02 |
| 2010/0222084 | A1 * | 9/2010 | Butterfield et al. ........... 455/458 |

* cited by examiner

*Primary Examiner* — Duc Nguyen
*Assistant Examiner* — Assad Mohammed

(57) ABSTRACT

Systems and methods are disclosed to assist a caller and a callee in establishing successful telephonic communications. In embodiments of the systems and methods, a telephonic call set-up network node or a callee user device of the callee may receive a call set-up request to establish a telephonic call between the caller user device of the caller and the callee user device. If the call-set up request is determined to be unsuccessful, one or more proximate user devices nearby the callee user device may be identified. Another telephonic call may be induced, this time between the caller user device and one of the proximate user devices identified to be nearby the callee user device. In this manner, success telephonic communications may be established despite the callee not being able to answer the callee user device during the original telephonic call set-up request.

17 Claims, 10 Drawing Sheets

SYSTEM AND METHOD FOR ASSISTING A CALLEE AND A CALLER IN ESTABLISHING TELEPHONIC COMMUNICATIONS

RELATED APPLICATIONS

This application claims the benefit of provisional patent application Ser. No. 61/443,400, filed Feb. 16, 2011, the disclosure of which is hereby incorporated herein by reference in its entirety.

FIELD OF THE DISCLOSURE

This disclosure relates generally to systems and methods of assisting a caller and callee in establishing successful telephonic communications.

BACKGROUND

Often a callee is disposed to telephonic communications with a caller, but is unable to answer a telephonic call for various reasons. For example, the callee may be unable to hear the ring of the callee's user device due to loud ambient noise, the callee may have forgotten to turn on a ringer of the callee's user device, or the callee may be unable to feel the vibrations of the callee's user device. Accordingly, there exists a need to assist the caller and the callee in establishing successful telephonic communications during these types of circumstances.

SUMMARY

This disclosure relates generally to systems and methods of assisting callers and callees in establishing successful telephonic communications. In embodiments of the systems and methods, a telephonic call set-up network node or a callee user device of the callee may receive a call set-up request to establish a telephonic call between the caller user device of the caller and the callee user device. When the call-set up request is determined to be unsuccessful, one or more proximate user devices nearby the callee user device may be identified in order to assist the caller and callee in establishing telephonic communications. An other telephonic call may be induced, this time between the caller user device and one of the proximate user devices identified to be nearby the callee user device. In this manner, the caller and the callee are assisted in establishing telephonic communications despite the callee not being able to answer the callee user device during the original telephonic call set-up request.

Those skilled in the art will appreciate the scope of the present disclosure and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the disclosure, and together with the description serve to explain the principles of the disclosure.

DETAILED DESCRIPTION

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

This disclosure relates generally to systems and methods of assisting callers and callees in establishing successful telephonic communications. For example, there may be occasions when a callee is disposable to take a telephonic call from a caller, but, for reasons unrelated to the availability of the callee, the callee is unable or inaccessible to answer the telephonic call. In embodiments of the systems and methods, a telephonic call set-up network node or a callee user device of the callee may receive a call set-up request to establish a telephonic call between the caller user device of the caller and the callee user device. This telephonic call set-up request may be determined to be unsuccessful. For instance, the telephonic call set-up request may have gone unanswered, the telephonic call set-up request may have been redirected to the callee's voicemail, the telephonic call set-up request may have resulted in a busy signal, and/or the like. To assist the caller and callee in establishing telephonic communications after an unsuccessful call set-up request, one or more proximate user devices nearby the callee user device may be identified either by the callee user device or by the telephonic call set-up network node. An other telephonic call between the caller user device of the caller and one of the identified proximate user devices is induced, which may assist in establishing a successful telephonic communication between the caller and the callee.

One manner of inducing the other telephonic call is sending contact information of one of the proximate user devices to the caller user device. The caller user device may then use the contact information of the proximate user device to transmit another call set-up request to establish the other telephonic call between the caller user device and the proximate user device. If the proximate user device is answered, a successful telephonic communication may be established between the callee through the proximate user device and the caller through the caller user device. Alternatively, to induce the other telephonic call between the caller user device and the proximate user device, a call reroute request may reroute the original telephonic call set-up request to establish the other telephonic call between the caller user device and the proximate user device nearby the callee user device.

Figure 1:
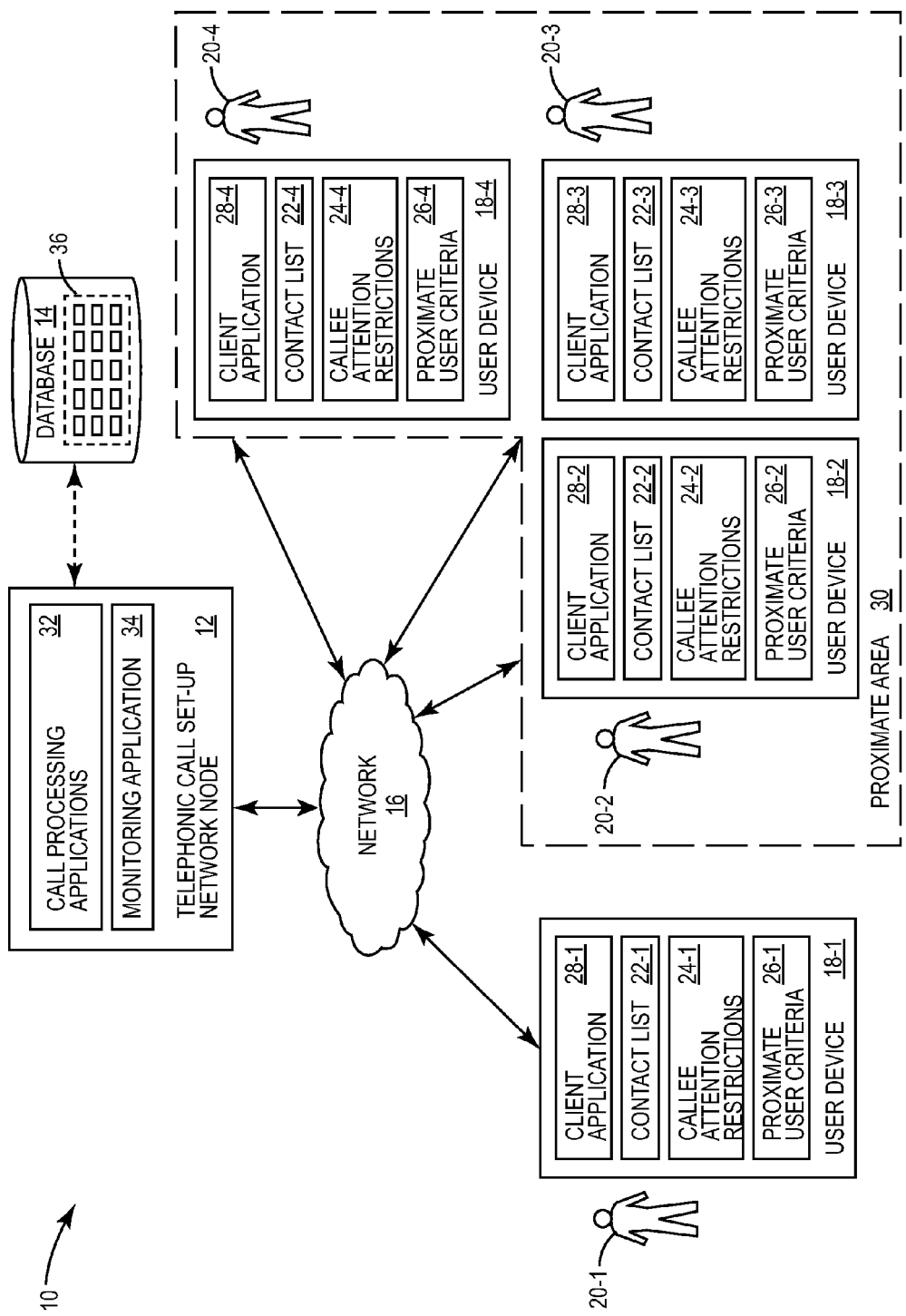
FIG. 1 illustrates one embodiment of a system for assisting a caller and a callee in establishing successful telephonic communications by inducing an other telephonic call between the caller user device of the caller and a proximate user device of another user that has been identified as being nearby a callee user device of the callee.

FIG. 1 illustrates a system 10 according to one embodiment of the present disclosure. Prior to discussing the details of different implementations of the system 10, a general description of the embodiments of the system 10 is provided. In this embodiment, the system 10 includes a telephonic call set-up network node 12, a network 16, and user devices (referred to generically with reference as element "18" and individually as elements "18-1" through "18-4"). The user devices 18 in FIG. 1 may be operable with the network 16 so that the network 16 may provide telephonic services between the user devices 18. The user devices 18 may each be associated with one or more users (referred to generically as element "20" and individually as elements "20-1" through "20-4").

The network 16 may be any type of network that allows for the establishment of telephonic calls between the user devices 18 including telephonic voice calls and telephonic video calls. Furthermore, the network 16 may include any number of distributed networks. For example, the network 16 may include a distributed public network such as the internet, one or more local area networks (LAN), one or more mobile communications networks, circuit-switch networks, packet-switch networks, and/or the like. If the network 16 includes various types of networks, the network 16 may include gateways, and/or the like, to permit communications between the different networks. Also, the network 16 may include wired components, wireless components, or both wired and wireless components. The user devices 18 and the telephonic call set-up network node 12 may be connected to the network 16 through various communication services that are adapted for connecting to a particular network.

The user devices 18 may be any type of user device capable of being utilized in a particular embodiment of the system 10. For example, the user devices may be mobile communication devices such as mobile smart phones, handheld computers, laptops, landline telephones, and/or the like. Some exemplary user devices that may be programmed or otherwise configured to operate in accordance with this disclosure are the Apple® iPhone, a mobile communication device programmed in accordance with Google's Android® operating system, Palm Pre®, Samsung Rogue®, Blackberry Storm®, and/the like. Note, this list is simply illustrative and is not intended to limit the scope of the present disclosure.

The user devices 18 may connect to the network 16 through Ethernet connections, local wireless connections (e.g., Wi-Fi), wireless telecommunications connections (e.g., 3G or 4G telecommunication connections such as GSM, LTE, W-CDMA, or WiMAX connections), and/or the like. These connections may allow the user devices 18 to be communicatively coupled to any type of telephonic circuit-switch network, packet-switch network, and/or the like. The specific manner in which user devices 18 connect to the network 16 may depend on the communicative features and functionality provided by a particular embodiment of the user devices 18.

The user devices 18 may also be operable to provide or make use of a wireless local area networking service. Using the wireless local area networking service, the user devices 18 can connect to one another directly via wireless local area networking links and/or access points to form a wireless local area network. It is to be understood that the term "wireless local area networking" as used herein is not meant to restrict the scope of this disclosure to any specific wireless local area networking technology. In general, the term wireless local area networking as used herein may refer to any short-range wireless networking technology that supports direct point-to-point communication, infrastructure-based local area communication services, and/or personal local area networking services that allow the formation of multi-hop ad hoc networks. As such, the term may include a wireless local area network (WLAN), a personal area network (PAN), a mobile ad hoc network (MANET), and any other type of network that utilizes near field communication technologies. Some examples of wireless local area networking services that may be used by the user devices 18 are Wi-Fi networking services, IEEE 802.11 networking services, Bluetooth networking services, ZigBee networking services, Z-Wave networking services, Infrared Data Association networking services, and/or the like.

In the embodiment illustrated in FIG. 1, each user device 18 includes a contact list (referred to generically as element "22" and individually as elements "22-1" through "22-4"). Each contact list 22 may include names, usernames, phone numbers, SIP addresses, SMS identities, email addresses, account numbers, and/or the like, of the contacts of the user 20. Some user devices 18 may, in conjunction with the contact list 22, present selectable icons to the user 20 that allow the user to select particular contacts for different types of communicative purposes. Furthermore, as shown in FIG. 1, the user devices 18 may also include callee attention restrictions (referred to generically as element 24 and individually as elements "24-1" through "24-4") that define restrictions for inducing telephonic calls to other user devices 18 if the user 20 is inaccessible through its user device 18. It should be noted that any one of the user devices 18 shown in FIG. 1 may be a caller user device that initiates a telephonic call and any of the user devices 18 may be a callee user device that is being requested to answer a telephonic call. Throughout the embodiments described herein, however, for the sake of explicatory purposes only, the user device 18-1 is assumed to be the caller user device and the user 20-1 is assumed to be the caller. Furthermore, the user device 18-2 is assumed to be the callee user device and the user 20-2 is assumed to be the callee.

Next, each user device 18 may also include a proximate user criteria (referred to generically as element "26" and individually as elements "26-1" through "26-4") that may define one or more criterion that describe requirements or preferences for contacting a proximate user device when the user 20 is inaccessible as a callee through his or her own user device 18. Finally, each of the user devices 18 includes a client application (referred to generically as element "28" and individually as elements "28-1" through "28-4") that is operable to provide the appropriate information to other devices connected to the network 16.

The user devices 18-3 through 18-4 are all within a proximate area 30 of the callee user device 18-2 meaning that each of the user devices 18-3 through 18-4 is nearby the callee user device 18-2. In this embodiment, the user devices 18-3 and 18-4 are assumed to be proximate user devices that are nearby the user device 18-2. Note, however, that any of the user devices 18 may be proximate user devices when nearby and within the proximity of other user devices 18. To detect the proximate user device 18-3 and the proximate user device 18-4, the callee user device 18-2 may use a wireless local area networking service. For example, the callee user device 18-2 may broadcast a probing signal on a wireless local area networking channel and may detect responses to the probing signal transmitted from the proximate user device 18-3 and the proximate user device 18-4 so as to detect the devices. On the other hand, the proximate user devices 18-3 and 18-4 may broadcast announcements of their presence which are detected by the callee user device 18-2.

Next, FIG. 1 also illustrates an embodiment of a telephonic call set-up network node 12. The telephonic call set-up network node 12 may be any type of device or group of devices on a communications network that functions to establish telephonic communication paths between the user devices 18. The particular implementation of the telephonic call set-up network node 12 may depend on the particular communication network or networks being utilized to establish the telephonic call. For example, the telephonic call set-up network node 12 may be a local exchange carrier (LAC) switch, inter-exchange carrier (IXC) switch, and/or the like. In this case, a service control point (SCP) may provide the telephonic call set-up network node 12 with an interface with the database 14. In another exemplary embodiment, the telephonic call set-up network node 12 may be a voice-over-IP (VoIP) server that is communicatively coupled to the database 14. In another embodiment, the telephonic call set-up network node 12 may be a Session Initiation Protocol (SIP) network element, such as a registrar, proxy server, or redirect server. The telephonic call set-up network node 12 in a SIP or VoIP based architecture may also include devices or groups of devices distributed over the Internet or Wide Area Network (WAN). Alternatively, in a mobile communications network, the telephonic call-set up network node 12 may also include a device or a group of devices such as routers, base stations, and cellular towers.

The telephonic call set-up network node 12 shown in FIG. 1 supports call processing applications 32. The call processing applications 32 may provide connection control services, call control services, services control such as control for three-way calling, call transfer, call waiting, voicemail, and/or the like. A monitoring application 34 may receive location data from the client applications 28 of the user devices 18. This location data identifies a location of the user devices 18. In this manner, the telephonic call set-up network node 12 may be able to keep up with the locations of the user devices 18. Note that, in the illustrated embodiment, a single telephonic call set-up network node 12 provides the call processing applications 32, the monitoring application 34, and/or the like. Also in this embodiment, the telephonic call set-up network node 12 operates directly with the database 14 which is also located at the same network location as the telephonic call set-up network node 12. This is not necessarily the case and in alternative embodiments, some, or all of the software applications may be provided by different devices operating cooperatively such as, for example, in one or more data centers. The telephonic call set-up network node 12 may be located either at the same network location or various different network locations distributed throughout the network 16.

The database 14 stores database records 36 which may include user profiles and affinity records indicating social relationships between the users 20, such as friends' lists, family lists, group lists, and/or the like. The user profile information in the user records may include user credentials (e.g., user name and password), communicative or non-communicative device identifiers, demographic information, general interest information, personal information, likes/dislikes, status information, and/or the like. In alternative embodiments, various databases may store the database records 36 throughout the network 16.

It should be noted that embodiments of different devices, such as telephonic call set-up network node 12 and the user devices 18, are described throughout this disclosure as using software applications to provide certain functionality. As is apparent to one of ordinary skill in the art, any system that is implemented through software applications has an equivalent hardware circuit with hardware circuits specifically configured to provide the same or some of the same functionality provided by the software application. Accordingly, this disclosure does not intend to limit the devices described herein to the utilization of software applications and general purpose hardware. Instead, the systems of these devices may be implemented using software applications, specifically designed hardware circuits, or some combination of both software applications and specifically designed hardware circuits. All of these implementations are considered to be within the scope of this disclosure.

Also, the software applications described in this disclosure are described as if being distinct software applications. This is done for the purposes of clarity but it may or may not necessarily be the case. Alternatively, the software applications may be partially or fully integrated with one another and/or may be partially or fully integrated as part of one or more other generalized software applications. These and other alternatives for providing the functionality of the software applications would be apparent to one of ordinary skill in the art in light of this disclosure and are considered within the scope of this disclosure.

Figure 2:
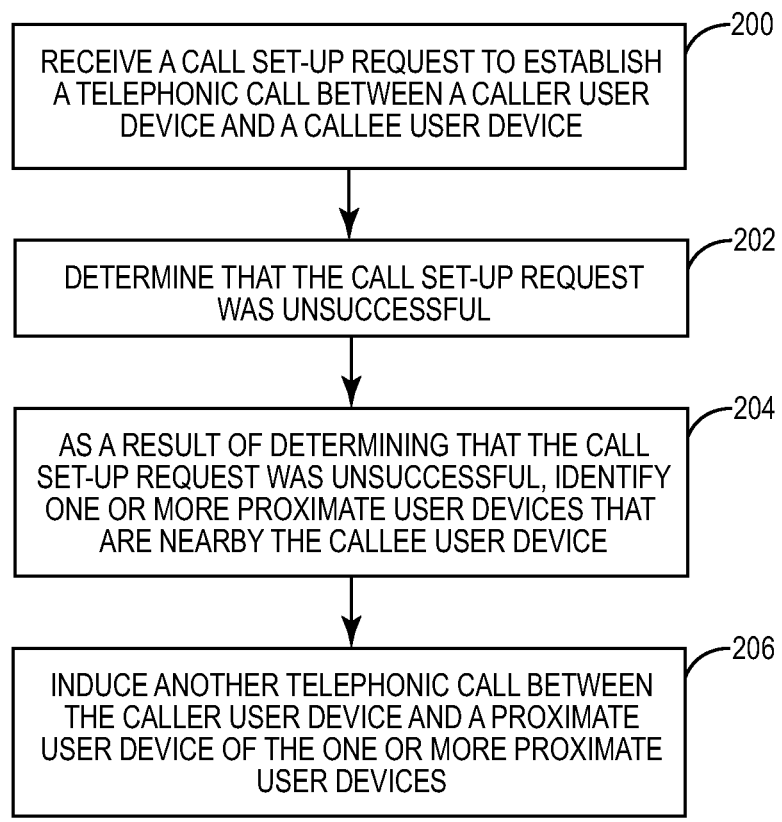
FIG. 2 illustrates exemplary procedures that may be performed in order to induce the other telephonic call between the caller user device and the proximate user device that has been identified as being nearby the callee user device.

Referring now to FIG. 2, FIG. 2 illustrates exemplary procedures for assisting the caller 20-1 and the callee 20-2 to establish successful telephonic communications if the callee 20-2 is inaccessible from his or her callee user device 18-2. As explained in further detail below, embodiments of the exemplary procedures shown in FIG. 2 may be implemented by either the callee user device 18-2 or the telephonic call set-up network node 12. To begin, a call set-up request is received to establish a telephonic call between the caller user device 18-1 of the caller 20-1 and the callee user device 18-2 of the callee 20-2 (procedure 200). The call set-up request may be any type of message and/or signal utilized in a call set-up procedure indicating an attempt to establish a telephonic call between the caller user device 18-1 and the callee user device 18-2.

Next, the call set-up request is determined to be unsuccessful (procedure 202). The call set-up request may be determined to have been unsuccessful by detecting that the telephonic call set-up request was not answered after a predefined number of telephonic rings, detecting that the telephonic call set-up request has been re-directed to voicemail, detecting that the telephonic call set-up request results in a busy signal, detecting that the callee user device 18-2 is deactivated, and/or the like. As a result of determining that the call set-up request was unsuccessful, one or more proximate user devices 18-3 and 18-4 are identified that are nearby the callee user device 18-2 (procedure 204). These proximate user devices 18-3 and 18-4 are within a proximate area 30 of the callee user device 18-2, as shown in FIG. 1. In one embodiment, the callee user device 18-2 identifies the proximate user devices 18-3 and 18-4. Detection techniques which may be implemented by the callee user device 18-2 to detect nearby proximate user devices 18-3 and 18-4 include broadcasting probing signals to scan for nearby devices and receiving responses to those probing signals from the proximate user devices 18-3 and 18-4. Alternatively, the callee user device 18-2 may detect announcements broadcasted through a wireless local area networking service from the proximate user devices 18-3 and 18-4.

In other embodiments, the telephonic call set-up network node 12 uses the monitoring application 34 to determine the proximate user devices 18-3 and 18-4 that are nearby the callee user device 18-2. The telephonic call set-up network node 12 may receive location data identifying the location of the callee user device 18-2 and the proximate user devices 18-3 and 18-4. This location data may, for example, be triangulation data obtained from the callee user device 18-2 and the proximate user devices 18-3, 18-4. On the other hand, the location data may be global positioning system (GPS) location data, and/or any other location data that identifies the location of the user device 18 in a two-dimensional or three-dimensional coordinate system. The telephonic call set-up network node 12 may determine that the proximate user devices 18-3 and 18-4 are nearby the callee user device 18-2 by determining whether the location of the proximate user devices 18-3 and 18-4 comply with geographic restrictions.

As a result of determining that the call set-up request was unsuccessful, another telephonic call may be induced between the caller user device 18-1 and one of the proximate user devices 18-3, 18-4 (procedure 206). In one embodiment, the other telephonic call between the caller user device 18-1 and one of the proximate user devices 18-3, 18-4 may be induced by transmitting a call reroute request in order to establish another telephonic call between the caller user device 18-1 and one of the proximate user devices 18-3 and 18-4. On the other hand, the other telephonic call between the caller user device 18-1 and one of the proximate user devices 18-3 and 18-4 may be induced by sending contact information for the proximate user devices 18-3 and 18-4 to the caller user device 18-1.

Figure 3:
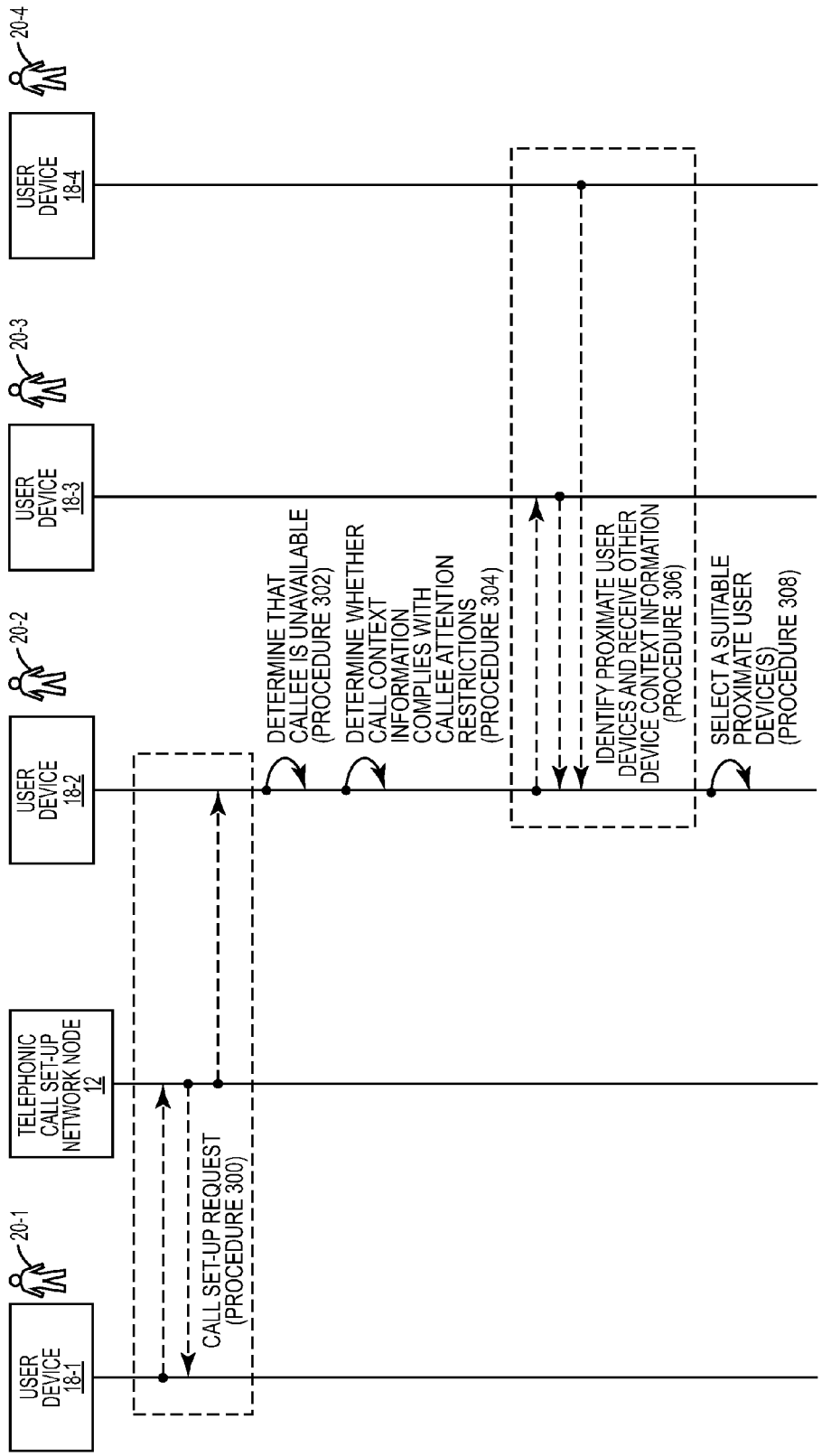
FIG. 3 is a flow diagram illustrating embodiments of procedures in which the callee user device identifies nearby proximate user devices as a result of determining that a call set-up request for a telephonic call between the callee user device and the caller user device was unsuccessful, along with other related procedures.

FIG. 3 illustrates one embodiment of the exemplary procedures 200, 202, and 204 discussed above with regards to FIG. 2, along with other related exemplary procedures. In FIG. 3, the callee user device 18-2 of the callee 20-2 implements the embodiment of the exemplary procedures 200, 202, and 204. To begin, a call set-up request procedure is performed when the caller user device 18-1 of the caller 20-1 initiates a telephonic call between the caller user device 18-1 and the callee user device 18-2 (procedure 300). The telephonic call set-up network node 12 has been provided to establish a telephonic communication path for the telephonic call between the caller user device 18-1 and the callee user device 18-2. Various types of call set-up requests are transmitted between the user device 18-1 and the telephonic call set-up network node 12 and between the telephonic call set-up network node 12 and the callee user device 18-2. The callee user device 18-2 may provide some type of audio and/or visual indication of the attempted telephonic call. The audio and/or video indication may be a telephone ring, a message on a display of the callee user device 18-2 indicating the attempted telephonic call, and/or the like. Also, during the procedure 300, call context information may be obtained by the callee user device 18-2 during the call set-up request procedure. For example, the call context information may include call identification information related to the attempted telephonic call. The call identification information may identify the caller 20-1. Other call context information may include a frequency of contact between the caller 20-1 and callee 20-2, a current mode of the callee user device (silent, etc.), the number of missed calls from the caller 20-1, relationship information for the caller 20-1 and callee 20-2, such as relationship information from a social networking site, and/or the like. In this embodiment, the callee user device 18-2 determines that the callee 20-2 is unavailable and/or otherwise inaccessible to answer the callee user device 18-2 (procedure 302).

Using the call context information from the call set-up request, the callee user device 18-2 may determine whether the call context information complies with callee attention restrictions 24-2 (procedure 304). These callee attention restrictions 24-2 may define circumstances where the callee 20-2 has deemed it acceptable to attempt further telephonic communications if the callee 20-2 does not answer the callee user device 18-2. For instance, the callee attention restrictions 24-2 may include a relationship restriction that identifies a required relationship between the caller 20-1 and the callee 20-2. The callee user device 18-2 may determine that the caller 20-1 complies with the relationship restriction by identifying the caller 20-1 on a list of users having the required relationships with the callee 20-2 based on the caller identification information that identifies the caller 20-1. In one example, the contact list 22-2 may include sub-lists of contacts having certain relationships with the callee 20-2. Some of these contacts may be for example family members where the callee 20-2 sets up a callee attention restriction 24-2 for family members only. In other embodiments, the list of users having the required relationship with the callee 20-2 may be obtained from a social networking site by the callee user device 18-2 so that only users having a specified relationship on the networking site with the callee comply with the callee attention restriction 24-2.

Alternatively or additionally, the callee user device 18-2 may include one or more sensors that measure one or more physical ambient quantities. Using the sensors, the callee user device 18-2 generates one or more sensor level parameters indicating the one or more physical ambient quantities. For example, the callee user device 18-2 may include a light sensor that measures the ambient illumination around the callee user device 18-2 or an audio sensor that measures an ambient noise level around the callee user device 18-2. The call context information transmitted during the call set-up request procedure 300 may include the sensor level parameters generated through the use of the sensors. Furthermore, the callee attention restrictions 24-2 may include one or more minimum sensor level requirements describing a minimum level of one or more physical ambient quantities for inducing another telephonic call. If the ambient light is very low, it could mean that the callee 20-2 does not want to be disturbed. Also, if the ambient noise is relatively low (at least compared to the volume setting for the ringer of the callee user device 18-2) this may mean that the callee 20-2 does not want to be disturbed, for example if the callee 20-2 is sleeping. Nevertheless, if the sensor level parameters comply with the minimum sensor level requirements, then the callee has indicated that further telephonic communications to the callee 20-2 should be attempted. Other call attention requirements may include an operational mode requirement (if the ringer is disabled, then attempt another telephonic communication), a minimum number of call set-up requests between the caller 20-1 and the callee 20-2, a required frequency of communications between the callee 20-2 and caller 20-1, and/or triggers associated with the callee's voicemail or text messaging.

Upon determining that the call context information complies with the callee attention restrictions 24-2, the callee user device 18-2 may identify proximate user devices 18-3 and 18-4 that are nearby the callee user device 18-2 and, in addition, may receive device context information from the proximate user devices 18-3 and 18-4 (procedure 306). From the detected proximate user devices 18-3 and 18-4, the callee user device 18-2 selects a suitable proximate user device(s) for inducing another telephonic call (procedure 308). Selecting the proximate user devices 18-3 and 18-4 may be based on the device context information for each of the proximate user devices 18-3 and 18-4. For instance, to select a suitable proximate user device(s), the caller user device 18-1 may obtain proximate user criteria 26, stored by the caller user device 18-1 in the contact list 22-1. The device contextual information may also include information indicating whether the proximate user devices 18-3 and 18-4 are currently engaged in another call, information indicating the availability of the user 20-3 and 20-4 to receive communications. This information may be presented to the caller 20-1 by the caller user device 18-1 in order for the caller 20-1 to select the most suitable proximate user device. Additionally, proximate user criteria 26 may be received from the callee user device 18-2, the proximate user device 18-3, or the proximate user device 18-4. The callee user device 18-2 may then determine whether the device context information of each of the proximate user devices 18-3 and 18-4 comply with the proximate user criteria.

In one embodiment, the proximate user criteria 26-3 and 26-4 define a required relationship in order for additional telephonic communications to be attempted to the callee 20-2 through the use of the proximate user devices 18-3 and 18-4. For instance, the users 20-3 and 20-4 may not want other telephonic communications to be attempted to their devices unless the callee user device 18-2 is assigned to a family member, a member of a group, and/or the like. The device context information may include user identification information that identifies the user 20-3 and 20-4 of the proximate user devices 18-3 and 18-4. To determine that the device context information of the proximate user device 18-3 and 18-4 complies with the relationship restriction, the callee user device 18-2 may identify the user 20-3 and 20-4 on a list of users having the required relationship with the callee 20-2 based on the user identification information that identifies the users 20-3 and 20-4. Again, the list of users with the required relationship may be provided by sub-lists within the contact list 22-2 or from a list provided by a social networking site.

Additionally or alternatively, the proximate user devices 18-3 and 18-4 may each include one or more sensors that measure one or more physical ambient quantities. For example, the proximate user devices 18-3 and 18-4 may include light sensors for measuring ambient light, audio sensors for measuring ambient noise levels, and/or the like. The device context information from the proximate user devices 18-3 and 18-4 may include sensor level parameters indicating the physical ambient quantities such as ambient illumination, ambient noise levels, and/or the like. Furthermore, the proximate user criteria 26-3 and 26-4 may include minimum sensor level requirements that describe a minimum level of the physical ambient quantities for inducing another telephonic call to the proximate user devices 18-3 and 18-4. Determining that the device context information complies with the proximate user criteria 26-3, 26-4 may include determining that the sensor level parameters from the proximate user devices 18-3 and 18-4 comply with the minimum sensor level requirements. Other proximate user criteria 26 defined by the users 20-3, 20-4, the caller 20-1, or the callee 20-2 may include a mode of the proximate user devices 18-3 and 18-4 (e.g., if the ringer is disabled, then use another proximate user device 18-3, 18-4), a minimum distance preference in which the proximate user device 18-3 and 18-4 to be utilized is the one with the smallest distance to the callee user device 18-2, a frequency of contact between the callee user device 18-2 and the proximate user devices 18-3, 18-4, triggers associated with the callee's voicemail or text messaging, and/or the like.

Figure 4:
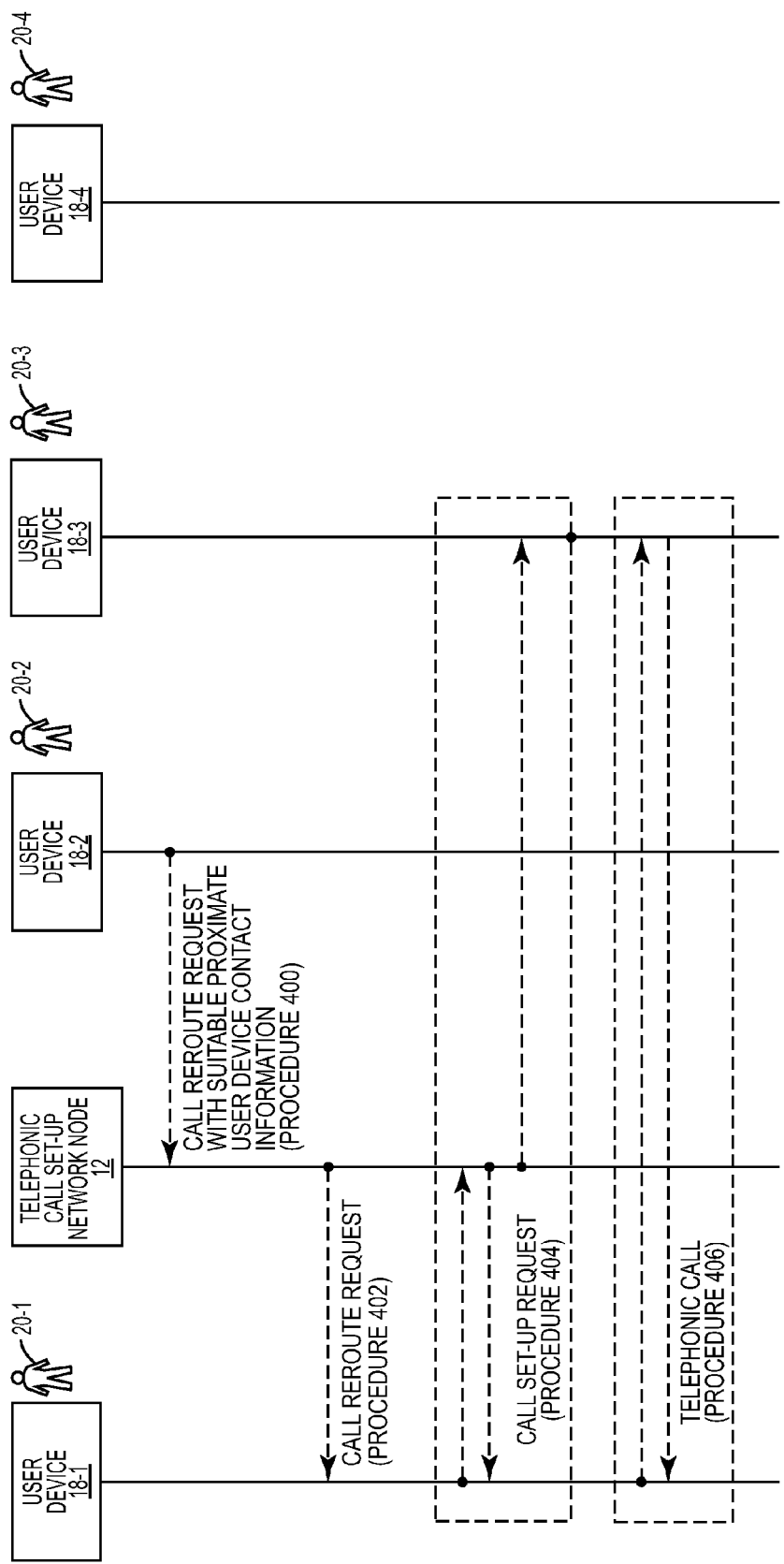
FIG. 4 is a flow diagram illustrating an embodiment where the callee user device induces an other telephonic call between the caller user device and the proximate user device that is nearby the callee user device by sending a call reroute request, along with other related procedures.

FIG. 4 illustrates an implementation of the procedure 206 performed by the callee user device 18-2, along with other exemplary procedures. In this embodiment, the callee user device 18-2 performs the implementation of the procedure 206 by sending a call reroute request with suitable proximate user device contact information of the selected proximate user device, which in this case is the proximate user device 18-3 (procedure 400). The telephonic call set-up network node 12 may then send the call reroute request to the caller user device 18-1 (procedure 402). Either through selection by the caller 20-1 or automatically, another call set-up request procedure is performed for another telephonic call (procedure 404), this time between the caller user device 18-1 and the proximate user device 18-3. When the user 20-3 answers the proximate user device 18-3, the telephonic call set-up networking 12 establishes a telephonic communication path for the other telephonic call between the caller user device 18-1 and the proximate user device 18-3. In this manner, the caller user device 18-1 and the proximate user device 18-3 may engage in the telephonic call (procedure 406). Upon the user 20-3 answering the telephonic call, the telephonic call set-up network node 12 may provide a message indicating that the telephonic call is for the callee 20-2. On the other hand, the call set-up request may indicate that, while the caller user device 18-1 is attempting to establish a telephonic call with the proximate user device 18-3, the telephonic call is intended for the callee 20-2.

Figure 5:
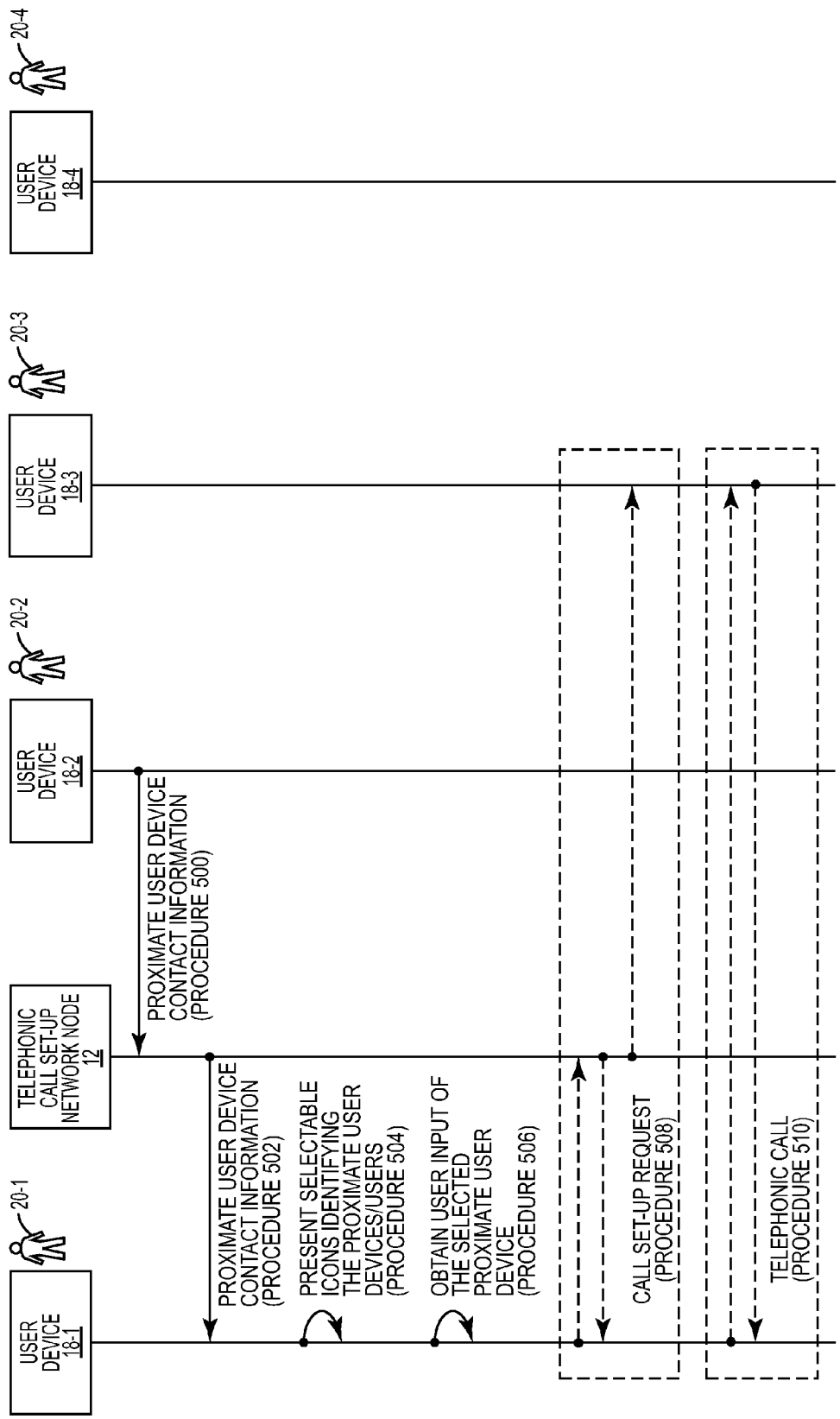
FIG. 5 is a flow diagram illustrating an embodiment where the callee user device induces the other telephonic call between the caller user device and the proximate user device that is nearby the callee user device by sending contact information for the proximate user device to the caller user device, along with other related procedures.

FIG. 5 illustrates another embodiment in which the callee user device 18-2 implements the exemplary procedure 206 shown in FIG. 2. To induce the other telephonic call between the caller user device 18-1 and the proximate user device 18-3, the callee user device 18-2 sends the proximate user device contact information of the proximate user devices 18-3, 18-4 (procedure 500). This contact information may have been obtained from the contact list 22-2 or from the proximate user devices 18-3, 18-4. The telephonic call set-up network node 12 then transmits the proximate user device contact information of the proximate user device 18-3 to the caller user device 18-1 (procedure 502). The proximate user device contact information regarding the proximate user devices 18-3 and 18-4 may be sorted by the caller user device 18-1, and/or previously by the callee user device 18-2, based on one or more criteria for presentation to the caller 20-1. For example, the contact information may be sorted so as to reflect social affinities between the caller 20-1, the callee 20-2, the user 20-3 of the proximate user device 18-3, and the user 20-4 of the proximate user device 18-4. Additionally or alternatively, user preferences, availability, an estimated likelihood that a telephonic call set up request would be successful to each of the particular proximate user devices 18-3, 18-4, and/or the like may be utilized to sort the proximate user device contact information. The caller user device 18-1 may then present selectable icons identifying the proximate user device 18-3, 18-4 or the users 20-3, 20-4 for selection by the caller 20-1, if desired (procedure 504). Upon selection, the caller user device 18-1 obtains user input of the selected proximate user device, in this case the proximate user device 18-3 (procedure 506). In response, the caller user device 18-1 initiates a call set-up request. Another call set-up request procedure (procedure 508) is performed to establish a telephonic call between the caller user device 18-1 and the selected proximate user device 18-3. As a result, once the user 20-3 answers the call set-up request, a telephonic call is established between the caller user device 18-1 and the proximate user device 18-3 (procedure 510). Again, a message may be played once the user 20-3 answers the telephonic call. On the other hand, the call set-up request to the proximate user device 18-3 may include information that is displayed by the proximate user device 18-3 and informs the user 20-3 that the telephonic call is intended for the callee 20-2.

Figure 6:
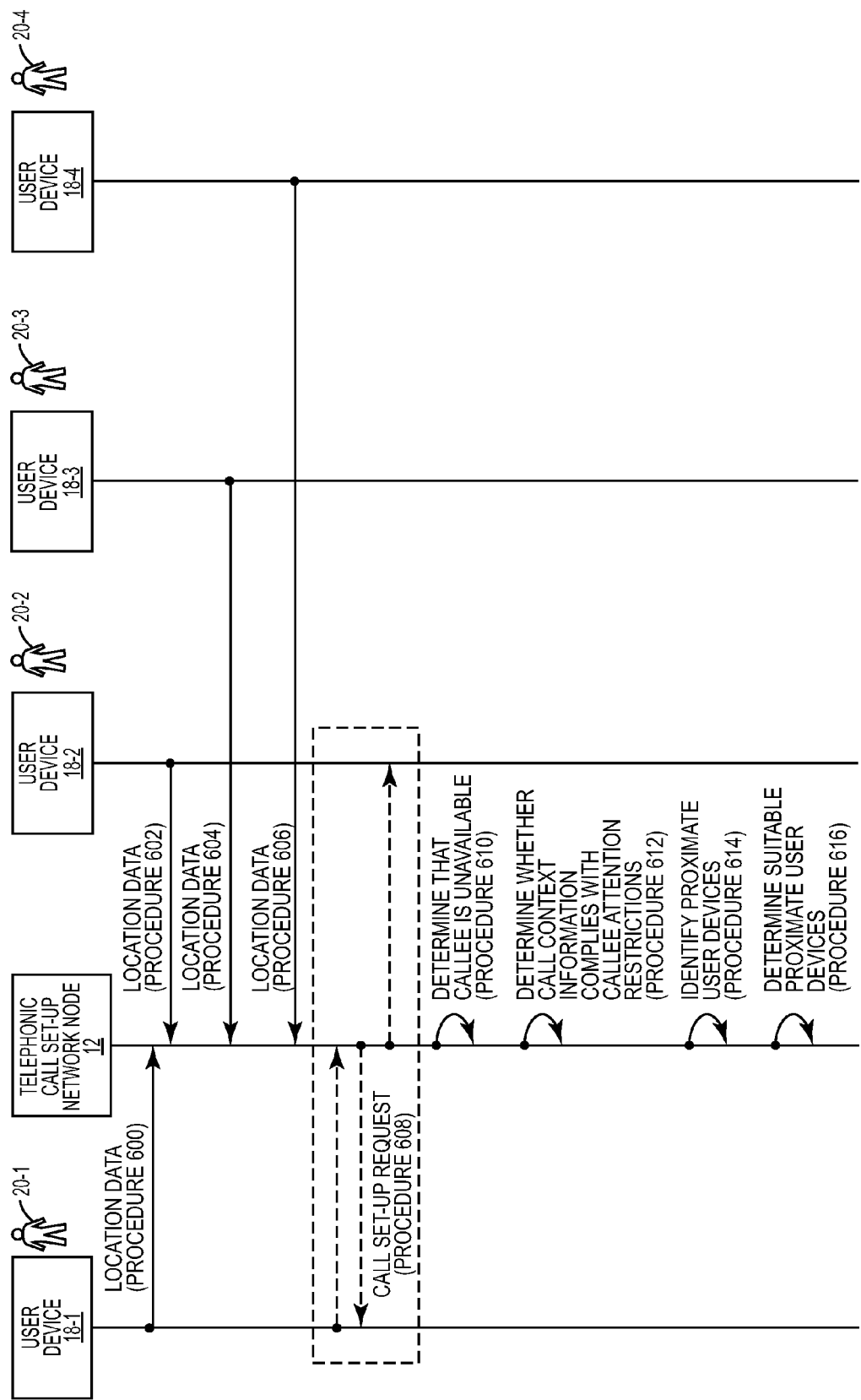
FIG. 6 is a flow diagram illustrating embodiments of procedures in which a telephonic call set-up network node identifies nearby proximate user devices as a result of determining that a call set-up request for a telephonic call between the callee user device and the caller user device was unsuccessful, along with other related procedures.

Referring now to FIG. 6, FIG. 6 illustrates an embodiment of the procedures 200, 202, and 204, shown in FIG. 2, along with other related exemplary procedures. In this embodiment, the telephonic call set-up network node 12 performs the procedures. As shown in FIG. 6, the telephonic call set-up network node 12 receives location data identifying the location of the caller user device 18-1, the callee user device 18-2, the proximate user device 18-3, and the proximate user device 18-4 (procedures 600, 602, 604, and 606, respectively). If desired, additional information related to the current location identified by the location data of the user devices 18 may be transmitted to and received by the telephonic call set-up network node 12. This additional information may include device identifications of other devices detected in wireless proximity of the user device 18, the identifications for WLAN access points that are nearby the user device 18, identifications for cellular towers in range of the user device 18, recently updated check-in information, and/or the like. Also, in some embodiments, the additional information may also include contextual information for the user devices 18 which may be utilized, as explained in further detail below, when the telephonic call set-up network node 12 is evaluating whether the contextual information related to the user device 18 complies with callee attention restrictions. To ensure privacy, this additional information may be hashed or otherwise cryptographically protected.

Initially, the caller user device 18-1 initiates a call set-up procedure (procedure 608) in which a telephonic call between the caller user device 18-1 and the callee user device 18-2 is requested. During the call set-up procedure, as shown by procedure 608, the telephonic call set-up network node 12 receives a call set-up request from the caller user device 18-1 and transmits another call set-up request to the callee user device 18-2. When the callee 20-2 does not answer, the telephonic call set-up network node 12 may determine that the callee 20-2 is unavailable or otherwise inaccessible from the callee user device 18-2 (procedure 610). This may involve terminating the call set-up request procedure 608 after a predetermined number of telephone rings. The telephonic call set-up network node 12 may also determine that the call set-up request was unsuccessful once the telephonic call set-up network node 12 goes to the callers' voicemail, once a busy signal is provided/detected, or once some other type of telephonic failure message is provided/detected.

Next, the telephonic call set-up network node 12 may determine whether call context information complies with callee attention restrictions 24-2. The callee attention restrictions 24-2 may come from user profiles or other information stored in database records 36 (procedure 612). Additionally, call context information may be obtained from telephonic messages/signals exchanged with the telephonic call set-up network node 12 during the call set-up request shown in procedure 608 and/or from the database records 36. Once the telephonic call set-up network node 12 determines that the call context information complies with the callee attention restrictions 24-2 of the callee 20-2, the telephonic call set-up network node 12 may identify proximate user devices (procedure 614). These proximate user devices 18-3, 18-4 may be determined using the location data identifying the location of the callee user device 18-2 and the proximate user devices 18-3 and 18-4. For example, one of the proximate user criteria 26-1 defined by the caller 20-1 may be a geographic restriction(s) defining how nearby the proximate user devices 18-3 and 18-4 need to be in order to be proximate. Any proximate user device, such as proximate user devices 18-3 and 18-4, which comply with this geographic restriction(s), may be determined to be nearby the callee user device 18-2. The compliance of the location of the proximate user devices 18-3 and 18-4 with the geographic restriction(s) may be evaluated directly using the location data (for example, such as GPS coordinates) of the proximate user devices 18-3 and 18-4. Alternatively, rather than or in addition to utilizing geographic restriction(s) to determine whether the proximate user devices 18-3 and 18-4 are nearby the callee user device 18-2, other techniques may be employed. For example, whether the proximate user devices 18-3 and 18-4 are nearby the callee user device 18-2 may be inferred by detecting overlap in device identifications transmitted from either other user devices to the telephone call set-up network node 12 or access points in wireless proximity with the user devices 18.

Furthermore, the proximate user criteria 26-3, 26-4, as described above, may be obtained from the proximate user devices 18-3, 18-4, and/or the database records 36. Proximate device context information may also be obtained from the proximate user devices 18-3, 18-4, and/or the database records 36. From the proximate user criteria 26-3, 26-4, and using the proximate device context information, the telephonic call set-up network node 12 determines suitable proximate user devices (procedure 616).

Figure 7:
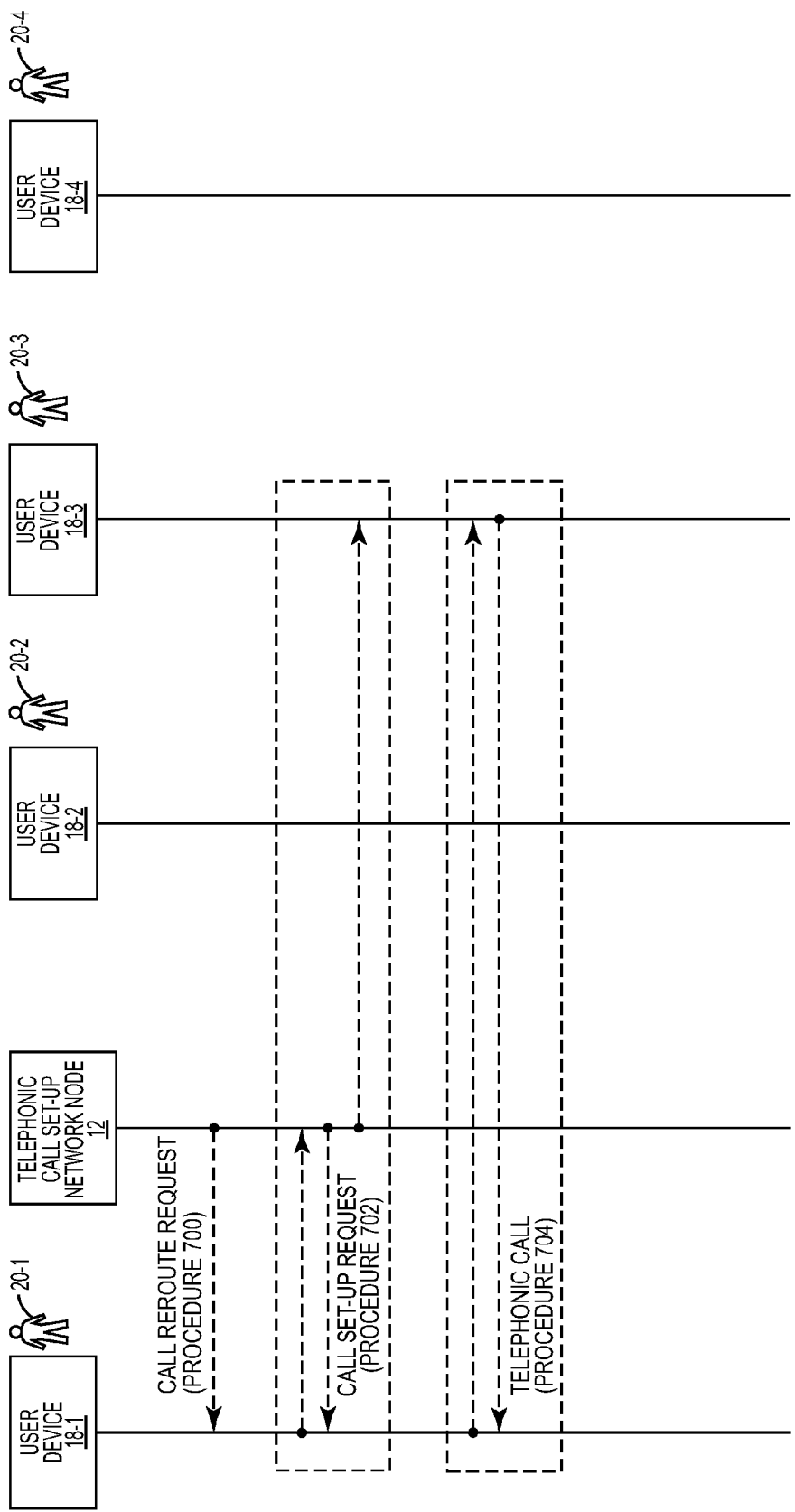
FIG. 7 is a flow diagram illustrating an embodiment where the telephonic call set-up network node induces an other telephonic call between the caller user device and the proximate user device that is nearby the callee user device by sending a call reroute request, along with other related procedures.

FIG. 7 illustrates one embodiment in which the telephonic call set-up network node 12 induces another telephonic call this time between the caller user device 18-1 and the proximate user device 18-3, which is one implementation of the exemplary procedure 206 shown in FIG. 2. This implementation of the exemplary procedure 206 shown in FIG. 2 is performed by the telephonic call set-up network node 12 by sending the call reroute request to the caller user device 18-1 (procedure 700). In response, another call set-up request procedure (procedure 702) is performed in which a telephonic call between the caller user device 18-1 and the proximate user device 18-3 is requested. The telephonic call set-up network node 12 may utilize contact information from the callee user device 18-2 or stored in database record 36 so as to provide the call set-up request service in accordance with procedure 702. In this manner, the caller user device 18-1 and the proximate user device 18-3 may engage in the telephonic call (procedure 704). Once the user 20-3 answers the proximate user device 18-3 either a message may be played by telephonic call set-up network node 12 or the call set-up request transmitted by the telephonic call set-up network node 12 to the proximate user device 18-3 may include information indicating that the telephonic call is intended for the callee 20-2 as discussed above.

It should be emphasized that the user devices 18 may be any type of user device allowing users 20 to engage in telephonic communications. While the user devices 18 were described as mobile communication devices, other non-mobile user devices can be configured to operate as user devices 18 in the system 10 shown in FIG. 1. For example, the user devices 18 may include landline telephones, computers running communications agents such as SIP User Agents, and other non-mobile communication devices. These non-mobile user devices may or may not be configured to be automatically detected as proximate to another user device and some may not be configured to automatically obtain location data identifying the location of the non-mobile user devices. Nevertheless, the location of these non-mobile user devices is static and thus can simply be manually associated with a static location.

For example, the callee 20-2 may be at their home or even at a friend's home. The callee user device 18-2 may receive a call set-up request to establish a telephonic call between the caller user device 18-1 of a caller 20-1 and the callee user device 18-2 of the callee 20-2. As a result of determining that the call set-up request was unsuccessful, the callee user device 18-2 may identify the landline telephone at their home or at their friend's home as a nearby proximate user device. More specifically, location data identifying a location of the callee user device 18-2 may be utilized and compared to locational information in the contact list 22-2. If the callee 20-2 is at their home, an entry of the contact list 22-2 having a landline telephone number of the landline at the home of the callee 20-2 may be identified as being nearby the callee user device 18-2. The callee user device 18-2 may induce another telephonic call either by sending a call reroute request for the landline telephone at their home or by sending the caller user device 18-1 the landline telephone number of the landline telephone at the callee's home. Similarly, if the callee 20-2 is at their friend's home, an entry of the contact list 22-2 having a landline telephone number of the landline at the home of the callee's friend may be identified as being nearby the callee user device 18-2. The callee user device 18-2 may induce another telephonic call either by sending a call reroute request for the landline telephone at their friend's home or by sending the caller user device 18-1 the landline telephone number of the landline telephone at the friend's home. The callee 20-2 may have manually configured the call list 22-2 to provide user preferences indicating the entries of the contact list 22-2 for which this is permitted.

Analogous functionality may be provided by the telephonic call set-up network node 12. In this case, the callee 18-2 may have configured user profile information to indicate locations for inducing additional telephonic calls if a telephonic call set-up request is unsuccessful. For example, the telephonic call set-up network node 12 may receive a call set-up request to establish a telephonic call between the caller user device 18-1 of a caller 20-1 and the callee user device 18-2 of the callee 20-2. As a result of determining that the call set-up request was unsuccessful, the telephonic call set-up network node 12 may identify the landline telephone at the callee's home or at the home of the callee's friend as a nearby proximate user device. More specifically, location data identifying a location of the callee user device 18-2 may be utilized and compared to locational information stored in the database records 36. If the callee 20-2 is at their home or at the home of the callee's friend, a landline telephone number of the landline at the home of the callee 20-2 or the home of the callee's friend may be identified as being nearby the callee user device 18-2. The telephonic call set-up network node 12 may induce another telephonic call either by sending a call reroute request for the landline telephone (at the callee's home or the home of the callee's friend) or by sending the caller user device 18-1 the landline telephone number. The callee 20-2 and/or the callee's friend may have manually configured their user profiles so that the appropriate permissions are granted to allow this to occur.

Figure 8:
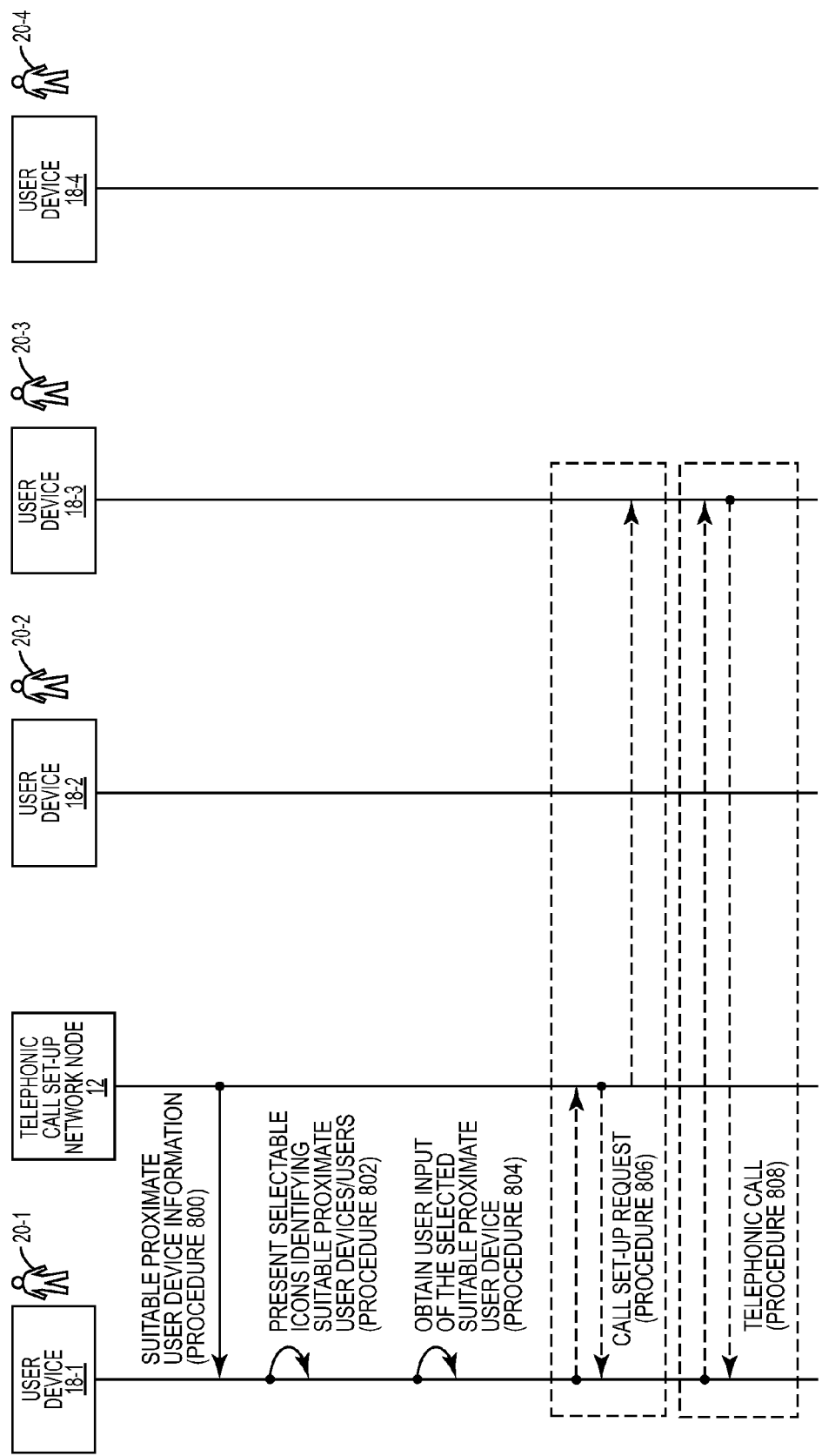
FIG. 8 is a flow diagram illustrating an embodiment where the telephonic call set-up network node induces the other telephonic call between the caller user device and the proximate user device that is nearby the callee user device by sending contact information for the proximate user device to the caller user device, along with other related procedures.

FIG. 8 illustrates another embodiment of the exemplary procedure 206 implemented by the telephonic call set-up network node 12. In this embodiment the exemplary procedure 206 shown in FIG. 2 is implemented when the telephonic call set-up network node 12 transmits suitable proximate user device information to the caller user device 18-1 (procedure 800). The suitable proximate user device information may include contact information for the proximate user device 18-3 and the proximate user device 18-4. The proximate user device contact information regarding the proximate user devices 18-3 and 18-4 may be sorted by the caller user device 18-1, and/or previously by the telephonic call set-up network node 12, based on one or more criteria for presentation to the caller 20-1. For example, the contact information may be sorted so as to reflect social affinities between the caller 20-1, the callee 20-2, the user 20-3 of the proximate user device 18-3, and the user 20-4 of the proximate user device 18-4. Additionally or alternatively, user preferences, availability, an estimated likelihood that a telephonic call set up request would be successful to each of the particular proximate user devices 18-3, 18-4, and/or the like may be utilized to sort the proximate user device contact information.

The caller user device 18-1 may then present selectable icons identifying the suitable proximate user devices 18-3, 18-4, and/or the users 20-3 and 20-4 (procedure 802). This may be done once it is determined that both the proximate user device 18-3 and the proximate user device 18-4, or the users 20-3 and 20-4 comply with proximate user criteria 26-3, 26-4 as discussed above. Once the caller 20-1 selects one of the selectable icons, user input is obtained by the caller user device 18-1 of the selected suitable proximate user device, which in this example is the proximate user device 18-3 (procedure 804). In response, another call set-up request procedure is implemented to establish a telephonic call between the caller user device 18-1 and the proximate user device 18-3 (procedure 806). Upon answering the call set-up request, the telephonic call set-up network node 12 may cause the proximate user device 18-3 to play a message indicating that the telephonic call is intended for the callee 20-2. On the other hand, information may be sent by the telephonic call set-up network node 12 during the call set-up request procedure 806 which indicates that the telephonic call is intended for the callee 20-2. In this manner, the caller user device 18-1 and the proximate user device 18-3 can engage in a telephonic call (procedure 808).

Figure 9:
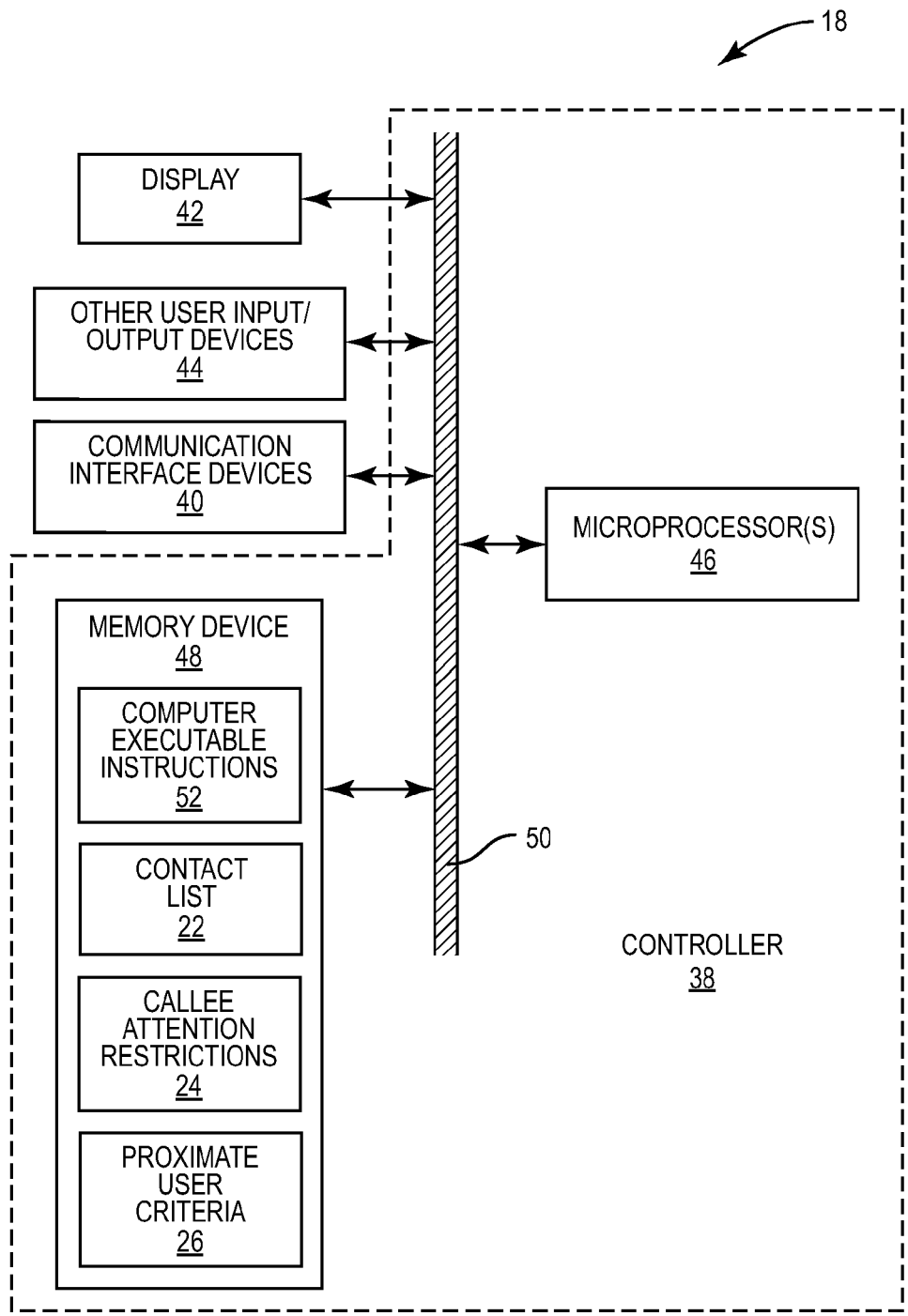
FIG. 9 illustrates one embodiment of a user device, which may be utilized as either the caller user device, the callee user device, or the proximate user devices.

FIG. 9 illustrates one embodiment of a user device 18, which may be either the caller user device 18-1, callee user device 18-2, proximate user device 18-3, or the proximate user device 18-4 (shown in FIG. 1). The user device 18 includes a controller 38, one or more communication interface devices 40, a display 42, and other user input/output devices 44. The communication interface devices 40 are operable to communicatively couple the user device 18 to the network 16. As discussed above, the network 16 may include various different types of mobile communication networks, packet-switch networks, and circuit-switch networks. The communication interface devices 40 may be adapted to facilitate communications with one or more communication services on the network 16 and allow the user device 18 to detect other user devices as discussed above.

The controller 38 has general purpose computer hardware which in this case includes one or more microprocessors 46, non-transitory computer readable medium, such as a memory device 48, and a system bus 50. The system bus 50 is operably associated with the microprocessors 46, memory device 48, the communication interface devices 40, the display 42, the other user input/output devices 44, and other devices internal to the user device 18, so as to facilitate communication between the devices. The controller 38 may include other hardware such as control logic, other processing devices, additional non-transitory computer readable mediums, and the like. In this embodiment, the memory device 48 stores computer executable instructions 52 that configure the operation of the microprocessors 46 in order for the microprocessors 46 to implement the software applications of the user device 18 discussed above. The memory device 48 also stores the contact list 22, the callee attention restrictions 24, and the proximate user criteria 26.

Figure 10:
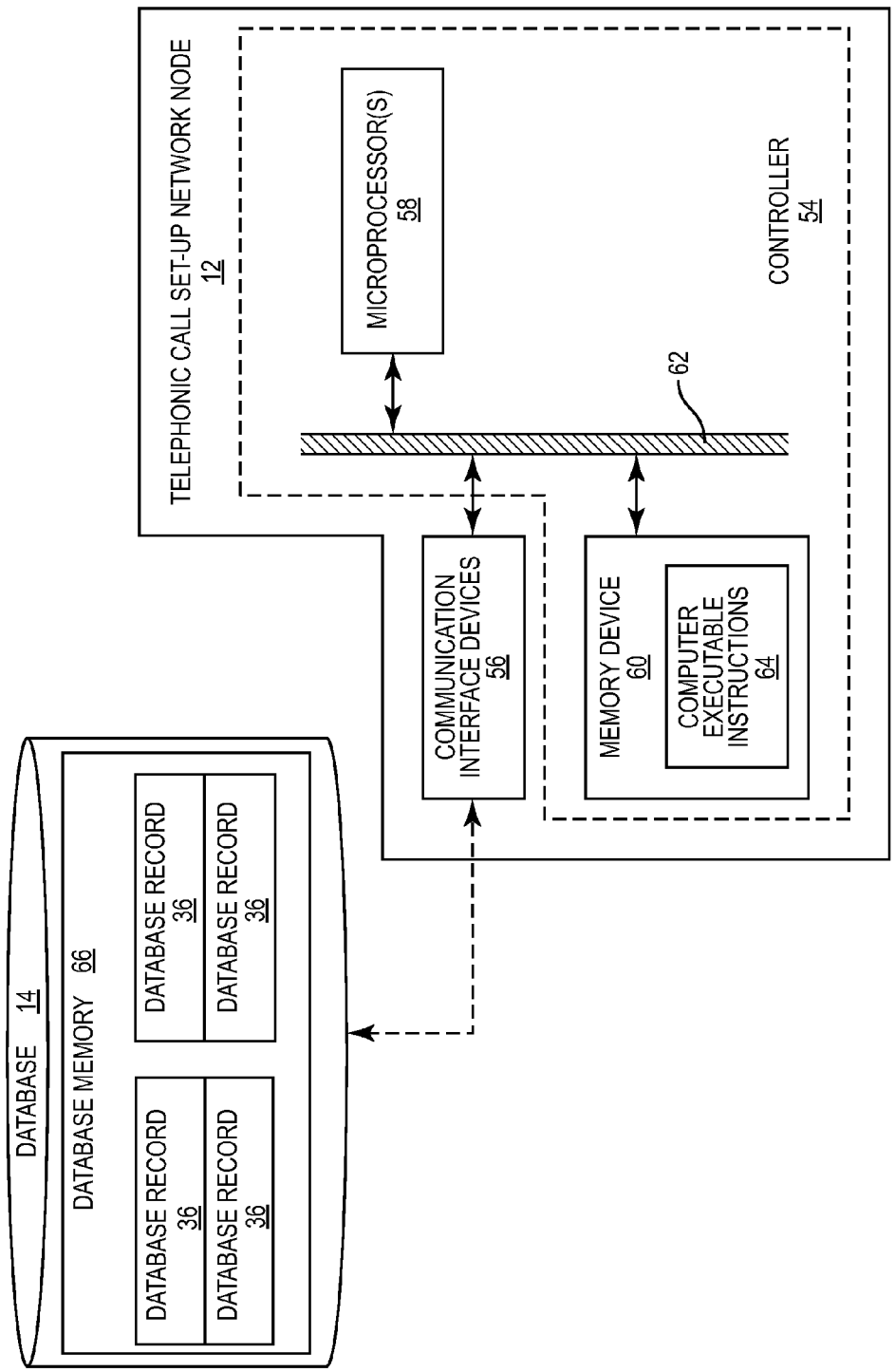
FIG. 10 illustrates one embodiment of a telephonic call set-up network node.

FIG. 10, illustrates one embodiment of the telephonic call set-up network node 12 (shown in FIG. 1). The telephonic call set-up network node 12 includes a controller 54 and one or more communication interface devices 56. Also shown is one embodiment of the database 14 connected to the telephonic call set-up network node 12 through the communication interface devices 56. The communication interface devices 56 may also be operable to communicatively couple the telephonic call set-up network node 12 to the network 16. As discussed above, the network 16 may include various different types of networks and the communication interface devices 56 may be adapted to facilitate communications with one or more of these network types. In this example, the communication interface devices 56 may facilitate any number of communications provided by mobile communications networks, packet-switch networks, circuit-switch networks, and/or the like. Note that the telephonic call set-up network node 12 may be equipped with two or more communication interface devices 56, such as for example, one to communicatively couple the telephonic call set-up network node 12 to a public network and one to connect the telephonic call set-up network node 12 to the database 14 over, for example, a private high speed LAN.

In this embodiment, the controller 54 has general purpose computer hardware, in this case, one or more microprocessors 58 and a non-transitory computer readable medium such as a memory device 60. The controller 54 may also include other hardware such as a system bus 62, control logic, other processing devices, additional non-transitory computer readable mediums, and/or the like. Other user input/output devices (not shown), such as monitors, keyboards, mouse, touch screens, and the like may also be provided to receive input/output information from a manager of the telephonic call set-up network node 12. In this embodiment, the memory device 60 stores computer executable instructions 64 that are executable by the microprocessors 58. The computer executable instructions 64 may configure the operation of the microprocessors 58 so that the microprocessors 58 implement the software applications of the telephonic call set-up network node 12 discussed above. The system bus 62 may be operably associated with the microprocessors 58, the memory device 60, the communication interface devices 56, and other hardware components internal to the telephonic call set-up network node 12, so as to facilitate communication between these devices.

As shown in FIG. 10, the database 14 includes database memory 66 that stores the database records 36. The database records 36 may include user profile information for the caller 20-1, the callee 20-2, the user 20-3, and the user 20-4 (shown in FIG. 1). The database 14 may also store additional information such as database tables and local memory. Additionally, the database 14 may include additional programmed hardware components (not shown) that allow the creation, search, organization, retrieval, updating, and storage of the database records 36.

Those skilled in the art will recognize improvements and modifications to the preferred embodiments of the present disclosure. All such improvements and modifications are considered within the scope of the concepts disclosed herein and the claims that follow.

What is claimed is:

1. A method, comprising:
   receiving a call setup request to establish a telephonic call between a caller user device of a caller and a callee user device of a callee;
   determining whether the call setup request was unsuccessful;
   as a result of determining that the call setup request was unsuccessful, identifying a plurality of proximate user devices that are nearby the callee user device;
   receiving device context information for each of the plurality of proximate user devices, the device context information including user identification information that identifies a user of a different one of the plurality of proximate user devices;
   selecting one of the plurality of proximate user devices for inducing the other telephonic call from the plurality of proximate user devices by:
      obtaining one or more proximate user criteria including a relationship restriction that identifies a relationship restriction between the user of the different one of the plurality of proximate user devices and the callee; and
      determining that the device context information of the proximate user device for inducing the other telephonic call from the plurality of proximate user devices complies with the one or more proximate user criteria; and
   inducing an other telephonic call between the caller user device and the selected proximate user device of the plurality of proximate user devices.

2. The method of claim 1, wherein receiving the call setup request further comprises obtaining call context information for the call setup request.

3. The method of claim 2, wherein, prior to identifying the one or more proximate user devices that are nearby the callee user device, the method further comprises: determining that the call context information complies with one or more callee attention restrictions.

4. The method of claim 3, wherein the call context information includes caller identification information that identifies the caller and wherein the one or more callee attention restrictions include a relationship restriction that identifies a required relationship between the caller and the callee.

5. The method of claim 4, wherein determining that the call context information complies with the one or more callee attention restrictions comprises: determining that the caller complies with the relationship restriction by identifying the caller on a list of users having the required relationship with the callee based on the caller identification information that identifies the caller.

6. The method of claim 3, wherein the callee user device comprises one or more sensors that measure one or more physical ambient quantities so that the callee user device generates one or more sensor level parameters indicating the one or more physical ambient quantities, wherein the call context information includes the one or more sensor level parameters, and wherein the one or more callee attention restrictions comprise one or more minimum sensor level requirements each describing a minimum level of one of the one or more physical ambient quantities for inducing the other telephonic call.

7. The method of claim 6, wherein determining that the call context information complies with the one or more callee attention restrictions comprises determining that the one or more sensor level parameters comply with the minimum sensor level requirements.

8. The method of claim 1, wherein determining that the device context information of the proximate user device for inducing the other telephonic call from the plurality of proximate user devices complies with the relationship restriction comprises:
determining that the user of the proximate user device for inducing the other telephonic call complies with the relationship restriction by identifying the user of the proximate user device on a list of users having the required relationship with the callee based on the user identification information that identifies the user of the proximate user device.

9. The method of claim 1, wherein the proximate user device for inducing the other telephonic call comprises one or more sensors that measure one or more physical ambient quantities so that the proximate user device for inducing the other telephonic call generates one or more sensor level parameters indicating the one or more physical ambient quantities, wherein the device context information includes the one or more sensor level parameters, and wherein the one or more proximate user criteria comprise one or more minimum sensor level requirements each describing a minimum level of one of the one or more physical ambient quantities for inducing the other telephonic call.

10. The method of claim 9, wherein determining that the device context information complies with the one or more proximate user criteria comprises determining that the one or more sensor level parameters comply with the minimum sensor level requirements.

11. The method of claim 1, wherein inducing another telephonic call between the caller user device and the selected proximate user device of the one or more proximate user devices comprises sending a call-reroute request.

12. The method of claim 1, wherein inducing another telephonic call comprises sending contact information for the selected proximate user device of the one or more proximate user devices to the caller user device.

13. The method of claim 1, wherein inducing another telephonic call between the caller user device and the selected proximate user device of the one or more proximate user devices is performed by the callee user device.

14. The method of claim 1, wherein inducing another telephonic call between the caller user device and the selected proximate user device of the one or more proximate user devices is performed by a telephonic call setup network node.

15. A computer device, comprising:
one or more communication interface devices operable to communicate with a network;
a controller having at least one processor and operably associated with the one or more communication interface devices and configured to:
receive a call setup request to establish a telephonic call between a caller user device of a caller and a callee user device of a callee;
determine whether the call setup request was unsuccessful;
as a result of determining that the call setup request was unsuccessful, identify a plurality of proximate user devices that are nearby the callee user device;
receive device context information for each of the plurality of proximate user devices, the device context information including user identification information that identifies a user of a different one of the plurality of proximate user devices;
select one of the plurality of proximate user devices for inducing the other telephonic call from the plurality of proximate user devices by:
obtaining one or more proximate user criteria including a relationship restriction that identifies a relationship restriction between the user of the different one of the plurality of proximate user devices and the callee; and
determining that the device context information of the proximate user device for inducing the other telephonic call from the plurality of proximate user devices complies with the one or more proximate user criteria; and
induce an other telephonic call between the caller user device and the selected proximate user device of the plurality of proximate user devices.

16. The method of claim 15, wherein the computer device is one of either the callee user device or a telephonic call set-up network node.

17. A non-transitory computer readable medium that stores computer executable instructions, wherein the computer executable instructions are operable to instruct one or more microprocessors to:
receive a call setup request to establish a telephonic call between a caller user device of a caller and a callee user device of a callee;
determine whether the call setup request was unsuccessful;
as a result of determining that the call setup request was unsuccessful, identify a plurality of proximate user devices that are nearby the callee user device;
receive device context information for each of the plurality of proximate user devices, the device context information including user identification information that identifies a user of a different one of the plurality of proximate user devices;
select one of the plurality of proximate user devices for inducing the other telephonic call from the plurality of proximate user devices by:
obtaining one or more proximate user criteria including a relationship restriction that identifies a relationship restriction between the user of the different one of the plurality of proximate user devices and the callee; and
determining that the device context information of the proximate user device for inducing the other telephonic call from the plurality of proximate user devices complies with the one or more proximate user criteria; and
induce an other telephonic call between the caller user device and the selected proximate user device of the plurality of proximate user devices.

* * * * *